US 6,711,174 B1

United States Patent
Siegmund

(10) Patent No.: US 6,711,174 B1
(45) Date of Patent: Mar. 23, 2004

(54) PROCESS, CONTROL SYSTEM, TERMINAL, EXCHANGE, INCOUPLING DEVICE, DECOUPLING DEVICE, AND COMBINATION DEVICE FOR PROVIDING FUNCTIONS TO A TELECOMMUNICATIONS TERMINAL

(75) Inventor: Gerd Siegmund, Stuttgart (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/360,246

(22) Filed: Jul. 23, 1999

(30) Foreign Application Priority Data

Jul. 24, 1998 (DE) ......................................... 198 33 310

(51) Int. Cl.⁷ ............................................. H04L 12/28
(52) U.S. Cl. ..................... 370/419; 370/271; 370/463; 370/524; 379/355.03; 379/355.04
(58) Field of Search ................. 370/431, 437, 370/438, 439, 463, 524, 419, 420, 271, 421, 423; 379/157, 167, 195, 199, 209.1, 355.01, 355.02, 355.03, 355.04, 355.05, 372, 357.04, 350

(56) References Cited

U.S. PATENT DOCUMENTS

| 3,932,709 A | * | 1/1976 | Hoff et al. ................. 179/90 K |
| 4,722,082 A | * | 1/1988 | Furuya et al. ................. 370/85 |
| 5,341,418 A | | 8/1994 | Yoshida ....................... 370/465 |
| 5,481,598 A | | 1/1996 | Bergler et al. ........... 379/93.06 |
| 5,956,343 A | * | 9/1999 | Cornes et al. ............... 370/437 |
| 6,263,071 B1 | * | 7/2001 | Swan et al. ................. 379/372 |

FOREIGN PATENT DOCUMENTS

| DE | 195 27 815 C1 | 10/1996 | ............ H04M/3/42 |
| EP | 0 590 334 A1 | 4/1994 | ............ H04M/3/42 |
| EP | 0 774 851 A2 | 5/1997 | ............ H04L/29/06 |
| WO | WO 93/23809 A1 | 11/1993 | ............. H04J/3/00 |

OTHER PUBLICATIONS

Besselsen et al., "The Digital Terminal Adapters SOP–HO–LAM S375/P375 and TA 375", Phillips Telecommunication Review, Dec. 1990, pp. 28–35, vol. 48, No. 4, Hilversum, NL.

"Rufnummernanzeige am analogen Anschluss" [English translation: Telephone Number Display in the Analog Connection], in journal 'Funkschau', Edition 10/98, pp. 54 to 57.

* cited by examiner

Primary Examiner—Dang Ton
Assistant Examiner—Shick Hom
(74) Attorney, Agent, or Firm—Sughrue Mion, PLLC

(57) ABSTRACT

A process, a control system (CS), a terminal (TER), an exchange, an incoupling device, a decoupling device, and a combination device for providing functions to a telecommunications terminal (TER) which is connected to an exchange (EX) via a subscriber line (SL). Therein a connection (VL1, VL2) of the subscriber line is carried out via a control system (CS) on the network side while a decoupling device (DECP) decouples the connection from the subscriber line and an incoupling device (INCP) incouples the connection once again into the subscriber line. The control system provides the functions to the terminal by manipulation of data which are transmitted on the connection.

16 Claims, 5 Drawing Sheets

PROCESS, CONTROL SYSTEM, TERMINAL, EXCHANGE, INCOUPLING DEVICE, DECOUPLING DEVICE, AND COMBINATION DEVICE FOR PROVIDING FUNCTIONS TO A TELECOMMUNICATIONS TERMINAL

BACKGROUND OF THE INVENTION

This application is based on and claims the benefit of German Patent Application No. 198 33 310.2 filed Jul. 24, 1998, which is incorporated by reference herein.

The present invention relates to a process for providing functions to a telecommunications terminal (TER) which is connected to an exchange (EX) via a subscriber line (SL), a control system for a telecommunications network for providing functions to such a terminal, a terminal (TER) which can be connected to an exchange (EX) via a subscriber line (SL), decoupled from the connection (VL1, VL2), carried out via a control system (CS) and once again incoupled into the subscriber line (SL), an exchange to which such a terminal can be connected, and to incoupling, decoupling and combination devices each for providing functions to at least one telecommunications terminal which is connected to an exchange via a subscriber line.

Terminals for telecommunications networks, in particular, telephone sets, are equipped with various functions which make the operation of the terminals simpler or easier. Many of these functions are permanently installed into the terminals and immediately available, for example, redial, with which a previously dialed telephone number can be repeated with a single keystroke of a special redial key. However, before using other functions, the terminals must be programmed expressly for this purpose. For example, for a speed-dial key with which a telephone number consisting of several digits can be dialed by pressing a single key, a telephone number assignment must be input and stored in the terminal.

There are elegant terminals for, in particular, mobile data telecommunications networks and for ISDN telecommunications networks (ISDN=Integrated Services Digital Network). Terminals for such telecommunications networks can, for example, display the names of a caller in a display device. For this, the telephone number and the name of the caller must be input into a memory of such a terminal by the operator. In the case of an incoming call, the telephone number of the caller is transmitted in the form of a so-called CLIP (Calling Line Identification Presentation) signaling so that the terminal can find the name of the caller in its memory with the aid of a comparison of the transmitted telephone number to the stored telephone number and can display it on the display device.

If still more elegant functions are demanded of a terminal, then, on the one hand, a very high-performance terminal is necessary, for example, a terminal with a high-performance processor and a large memory. On the other hand, extensive and individually adaptable functions of such a terminal, such as, for example, a user interface, can only be configured with difficulty on such a terminal since this usually offers only a few special keys along with a numerical keyboard. Thus, for such a configuration, a personal computer is usually required which has at its disposal, along with an extensive keyboard, also a graphical input aid (for example, a mouse). The functions configured on the personal computer are then loaded as a software package over a connecting line to the terminal.

SUMMARY OF THE INVENTION

It is the objective of the invention to provide to a terminal, in a simple and efficient way, functions for a telecommunications network by loading data from a control system.

This objective is realized by a process for providing functions to a telecommunications terminal (TER) which is connected to an exchange (EX) via a subscriber line (SL) characterized by the fact that a connection of the subscriber line is carried out via a control system (CS) on the network side, while a decoupling device decouples the connection from the subscriber line and an incoupling device incouples the connection once again into the subscriber line, and that the control system provides the functions in the terminal (TER) by manipulation of data which are transmitted on the connection.

According to a further aspect of the invention, there is provided a control system (CS) for a telecommunications network with devices for providing functions to a terminal (TER) which is connected via a subscriber line (SL) to an exchange (EX) characterized by the fact that the control system (CS) has receiving means (R1) in order to receive data which are transmitted on a connection (VL1, VL2) decoupled from the subscriber line (SL) and once again incoupled into the subscriber line (SL), that the control system (CS) has transmission means (S1) to transmit data on the connection (VL2), and that the control system (CS) has means to provide the functions to the terminal (TER) by manipulation of data which are transmitted on the connection (VL1, VL2).

According to a still further aspect of the invention, there is provided a terminal (TER) for a telecommunications network with devices for providing functions to the terminal (TER) which can be connected to an exchange (EX) via a subscriber line (SL), decoupled from the connection (VL1, VL2), carried out via a control system (CS) and once again incoupled into the subscriber line (SL) characterized by the fact that the terminal (TER) has means via which it can be connected to the control system (CS) on the connection (VL1, VL2), and that the terminal (TER) has means to provide the functions with the aid of data which are transmitted on the connection (VL1, VL2) and manipulated by the control system (CS).

The invention further comprises an exchange to which a terminal can be connected via a subscriber line characterized by the fact that the exchange has decoupling means with which the exchange can decouple a connection from the subscriber line, that the exchange has incoupling means with which the exchange can incouple the connection into the subscriber line, and that the exchange has connecting means with which a control system can be connected to the connection.

The invention still further comprises an incoupling device (INCPX) for providing functions to at least one telecommunications terminal which is connected to an exchange via a subscriber line characterized by the fact that the incoupling device has connecting means (INCONSL, OUTCONSL) via which, along with the subscriber line (SL1), at least one additional subscriber line (SL2) can be connected to the incoupling device, that the incoupling device has incoupling means (INCOUP) with which the incoupling device can incouple at least one connection (VL1X, VL2X) into both the subscriber line (SL1) and the (at least) one additional subscriber line (SL2), and that the incoupling device has connecting means (CONCS) via which at least one control system (CSX) can be connected to the connections incoupled by the incoupling device and via which the incoupling device (INCPX) can receive data from the at least one control system (CSX) with which functions can be provided at least at the terminal.

There is also provided a decoupling device (DECPX) for providing functions to at least one telecommunications terminal which is connected to an exchange via a subscriber line characterized by the fact that the decoupling device has connecting means (INCONSL, OUTCONSL) via which, along with the subscriber line (SL1), at least one additional subscriber line (SL2) can be connected to the decoupling device, that the decoupling device has decoupling means (DECOUP) with which the decoupling device can decouple at least one connection (VL1X, VL2X) from each of the subscriber line (SL1) and the at least one additional subscriber line (SL2), and that the decoupling device has connection means (CONCS) via which the at least one control system (CSX) can be connected to the connections decoupled by the decoupling device and via which the decoupling device [sic] (INCPX) can transmit data to the at least one control system (CSX) with which functions can be provided at least to the terminal.

Finally, the invention includes a combination device (INDECPX) for providing functions to at least one telecommunications terminal which is connected to an exchange via a subscriber line characterized by the fact that the combination device has connecting means (INCONSL, OUTCONSL) via which, along with the subscriber line (SL1), at least one additional subscriber line (SL2) can be connected to the combination device, that the combination device has decoupling means (DECOUP) with which the incoupling device can decouple at least one connection (VL1X, VL2X) from both the subscriber line (SL1) and the (at least) one additional subscriber line (SL2), that the combination device has incoupling means (INCOUP) with which the combination device can incouple a connection (VL1X, VL2X) into both the subscriber line (SL1) and the (at least) one additional subscriber line (SL2), and that the combination device has connecting means (CONCS) via which at least one control system (CSX) can be connected to the connections decoupled by the combination device and via which the combination device (INCPX) can transmit data to the at least one control system (CSX) or can receive data from the at least one control system (CSX) where, with that data, functions can be provided at least to the terminal.

Advantageous further developments of the invention will be apparent from the description below and the appended claims.

BRIEF DESCRIPTION OF THE DRAWING

In the following, the invention and its advantages are represented in an exemplary embodiment with the aid of the drawings.

DETAILED DESCRIPTION OF THE INVENTION

Figure 1:
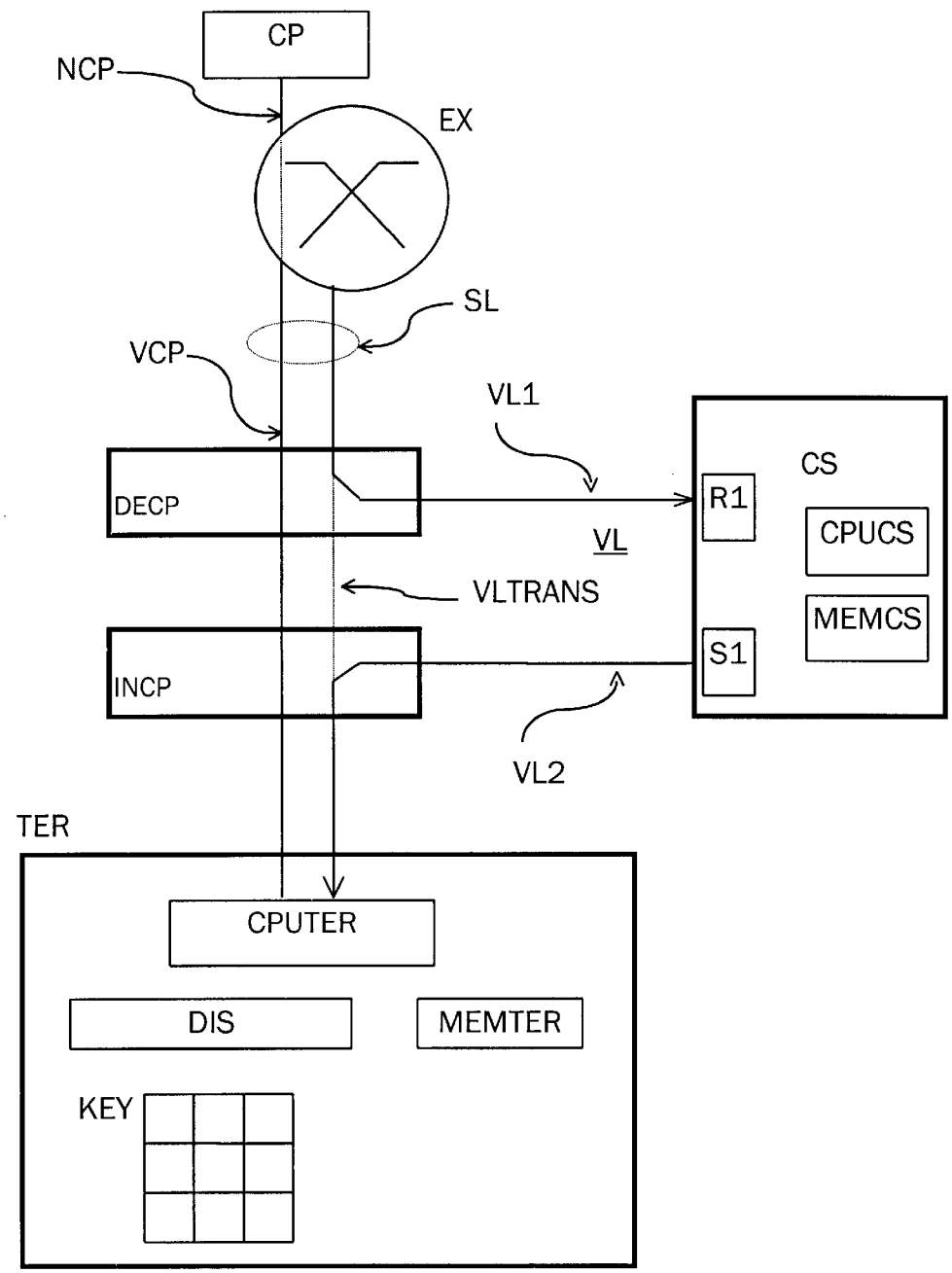
FIG. 1 shows an exemplary arrangement for the implementation of the process according to the invention with an exchange EX, a decoupling device DECP, an incoupling device INCP, a terminal TER, and a control system CS according to the invention.

An exemplary arrangement for the implementation of the process according to the invention is represented in FIG. 1. A terminal TER is connected via a subscriber line SL to an exchange EX. The subscriber line SL can also lead over a foreground device not represented in FIG. 1 which bundles along with the subscriber line SL additional subscriber lines for connection to the exchange EX. The terminal TER contains a control means CPUTER which controls the functions of the terminal, a display device DIS which serves for the visualization of information, a key array KEY, with which the terminal TER can be operated, and a memory MEMTER in which data for basic functions and data for special functions are stored. The terminal TER has at its disposal the basic functions of the telephone set, such as, for example, speech input, speech output, and the selection of telephone numbers. The means required for speech input and speech output, a microphone or loudspeaker, are generally known and thus not represented in FIG. 1. Furthermore the terminal TER can offer additional special functions by working together with a control system CS explained later, such as, for example, particular information on the display device DIS or a particular layout of the same.

On the subscriber line SL there are a connection VCP and a connection VL, which is represented in FIG. 1 subdivided into a connection section VL1 and a connection section VL2. The course of the subscriber line SL is indicated in FIG. 1 by the connection VCP and those parts of the connection sections VL1 and VL2 which run parallel to the connection VCP. The bundling of the connection VCP and the connection VL on the subscriber line SL is merely indicated by a dotted circular line. If the subscriber line SL is a subscriber line for analog transmission, the connection VCP can, for example, be an analog connection for the transmission of telephone conversations in which the connection VL is modulated in the form of an in-band signaling. Such a modulation of signals for a terminal through the exchange is described, for example, in the article "Rufnummeranzeige am analogen Anschluß" [in English translation, Telephone Number Display in the Analog Connection] in the journal "Funkschau", Edition of October 1998, Pages 54 to 57. If the subscriber line SL is a subscriber line of an ISDN telecommunications network with, for example, two B-channels and one D-channel, the connection VCP, for example, can be a B-channel, and the connection VL can be a D-channel or another B-channel on the ISDN subscriber line. The subscriber line SL could, however, also be an ADSL subscriber line (Asymmetric Digital Subscriber Line) on which the connection VCP is maintained on a first transmission channel and the connection VL on a second transmission channel. Via the connection VCP, the exchange EX can connect the terminal TER to additional telecommunications devices. Such a connection is represented in FIG. 1 in which the exchange EX connects the terminal TER to a telecommunications device CP via a connection section NCP. On the connection between the terminal TER and the telecommunication device CP, for example, a telephone conversation can be conducted or data transmission can be done. The connection section NCP is carried out, for example, over a telecommunications network not represented in FIG. 1. The telecommunications device CP can however also be connected directly to the exchange EX. The connection section NCP is then, for example, a subscriber line of the exchange EX.

In the following, we explain, first of all, a transmission and processing of data which are transmitted from the exchange EX going out on the connection VL and on the connection VCP to the terminal TER. On the connection VCP, data which the telecommunications device CP transmits to the terminal are passed from the exchange EX in the direction of the terminal TER. On the connection VL, on the other hand, the exchange EX transmits data to the terminal TER. The connection VCP is represented in FIG. 1 so that it is carried out via a decoupling device DECP as well as an incoupling device INCP. The data flow on the connection VCP however is not affected by these two devices.

From the subscriber line SL, the decoupling device DECP decouples the connection section VL1 from the connection VL. If the subscriber line SL is an ISDN subscriber line, the D-channel, for example, will be decoupled from the subscriber line by the decoupling device DECP. This is very easily possible since on the subscriber line SL transmission is digital so that the decoupling device DECP as a demultiplexer can take the data packets of the D-channel from the data stream to the terminal TER. The decoupling device DECP then passes the data packets received on the D-channel and decoupled by it to the control system CS and thus forms the connection section VL1 between the exchange EX and the control system CS. As is explained in more detail in the following sections, the control system CS can manipulate data transported on the connection VL, for example, according to predetermined rules or according to the specifications of a user of the terminal TER, and transmit on the connection section VL2 to the terminal TER. With the aid of this data the terminal TER is then in the position to provide functions to the user.

A D-channel of an ISDN subscriber line is primarily used for the exchange of control data between an exchange and a terminal. Thus, for example, the exchange EX on the D-channel on the subscriber line can, with the aid of a so-called "setup" message, signal the terminal TER that a call intended for the terminal TER by the exchange EX would be able to be put through to the terminal TER. Likewise the exchange EX can transmit a D-channel message with the telephone number of a caller, a so-called CLIP (Calling Line Identification Presentation) message with whose aid the terminal TER can display the telephone number of the caller in the case of an incoming call. If the connection VL is the D-channel of an ISDN subscriber line, then the decoupling device DECP can decouple and transmit to the control system CS such D-channel data packets from the data stream on the subscriber line SL.

The exchange EX can also transmit comparable data to the terminal TER with the D-channel data when the subscriber line SL is an analog subscriber line. In the article mentioned initially, "Rufnummeranzeige am analogen Anschluβ" in the journal "Funkschau", October 1998 edition, it is described, for example, how an exchange can also transmit a CLIP message to a terminal by modulating signals in the speech band of a subscriber line (i.e. by in-band signaling). The terminal must then take this CLIP message from the speech band by demodulation once again. Also, the exchange EX and the terminal TER can work together in such a manner. Then the decoupling device DECP determines the in-band signals on the subscriber line SL deriving from the exchange EX and transmits these to the control system CS. In addition, the decoupling device DECP can also determine if the exchange EX is sending signals for call display to the terminal TER, for example during the calling phase. Also, the decoupling device DECP then passes such information to the control system CS. In addition, if the connection section VL1 between the exchange EX and decoupling device DECP is produced by analog in-band signaling, data are advantageously exchanged between the decoupling device DECP and control system CS—digitally, since the components of the control system CS are preferably components for digital data processing.

The control system CS is not, as for example, a personal computer of a CSTA facility (Computer Supported Telephony Applications), disposed in the immediate vicinity of a terminal but rather is placed on the network side, preferably in the vicinity of the exchange EX. Then the control system CS can furnish, in a manner to be explained later, functions for several terminals comparable to the terminal TER and each connected via a subscriber line to the exchange EX. The control system CS has a control means CPUCS, a memory MEMCS, an output interface S1 to the connection section VL2, and an input interface R1 to the connection section VL1. The control system CS can, for example, be a high-performance computer with a processor as control means CPUCS and various memory means as memory MEMCS, for example a RAM (Random Access Memory) and a magnetic hard disk storage. The control means CPUCS, the memory MEMCS, the input interface R1, and the output interface S1 of the control system CS are connected to one another internally by the connections not represented in FIG. 1, for example by a common bus. The control means CPUCS carries out command sequences of machine commands which are stored as program modules in the memory MEMCS and can be called from there by the control means CPUCS. The control system CS can be a single computer of the personal computer or workstation type, a plug-in card for the exchange, a so-called "embedded system", or even a network of several computers. The design of the control system CS is however not essential for the implementation of the invention.

If the control system CS has received data sent by the decoupling device DECP on the connection section VL1, for example, the setup message mentioned or the CLIP message, the control system CS first of all analyzes these messages. Thereby, these messages are passed from the input interface R1 to the control means CPUCS which then, for example, determines by comparison with the standard data stored in the memory MEMCS whether and in what manner additional functions on the side of the control system CS are required by the message received.

The control system CS could pass on the setup message, for example, unprocessed to the terminal TER via the connection section VL1. For this the control system CS transmits the setup message via the output interface S1 to the incoupling device INCP which then incouples the message into the data stream on the subscriber line SL, for example while the incoupling device INCP sequentially arranges the setup message once again as a D-channel data packet in an ISDN data stream on the subscriber line SL. If it has been so predetermined by a corresponding configuration of the control system CS, this can, induced by reception of the setup message, also transmit additional data packets on the connection section VL2 to the terminal TER after the data packet with the setup message. For example, control information or command sequences can be contained in these data packets which the control means CPUTER can execute.

The terminal TER can, thereby, be enhanced for special functions. If, for example, the terminal TER is customarily not designed for the reception of fax messages, the control system CS can, for example, load software into the memory MEMTER of the terminal TER with which the control means CPUTER can pass fax messages received subsequent to the setup message via the connection VCP for storage in the memory MEMTER for printing later or for display on the display device DIS.

A function which is significantly simpler to realize but very useful in practice for a user of the terminal TER is effected by the control system CS and terminal TER working together in connection with the CLIP message mentioned. Also the control system CS can first of all "listen to" a CLIP message and pass it on unchanged to the terminal TER. The control means CPUTER will then pass the telephone number contained in the CLIP message for display on the display device DIS.

The display of a telephone number alone, however, is often not sufficient for the user to deduce the name of the caller. So that the user, however, does not have to store a possibly very extensive table assigning telephone numbers to names in the memory MEMTER of her/his terminal TER, an assignment table of this type is stored in the memory of the control system CS, in which table the name of the caller for each choice of telephone number is found. Subsequent to the CLIP message, the control system CS also transmits the corresponding names of the caller in the form of an additional message via the connection section VL2 to the terminal TER, which then, in addition or alternatively, can display this name on its display device DIS.

Also if the subscriber line SL is an analog subscriber line SL, the control system CS, adapting to a CLIP message received on the connection section VL1, transmits a name message with the name of a caller to the terminal TER. The control system CS transmits the CLIP message as well as the name message, first of all, to the incoupling device INCP which then modulates the message in the form of an in-band signaling to signals on the subscriber line SL. The terminal TER demodulates these in-band signals with the aid of a demodulator not represented in FIG. 1 and then shows the telephone number and name of the caller on the display device DIS.

In the case of "listening" and expanding of data on the connection VL by the control system CS it is possible, in particular in the case of an analog subscriber line SL, that the connection VL between the terminal TER and the exchange EX is passed through over the decoupling device DECP and the incoupling device INCP.

In FIG. 1 this is made clear by an additional connection path VLTRANS which is a type of bypass of the connection VL via the control system CS and thus, as a particular form of embodiment of the invention, is drawn as a dotted line. In such a configuration the decoupling device DECP listens to in-band signals on the subscriber line SL and conducts their contents to the control system CS, but passes the in-band signals on unchanged on the subscriber line SL via the connection path VLTRANS to the incoupling device INCP. This then modulates, if necessary, additional data transmitted by the control system CS, for example, the name message on the connection VL which was mentioned. In so far as the connection path VLTRANS is not desired in the case of an analog subscriber line SL, the decoupling device DECP can also filter out from the data stream on the subscriber line SL in-band signals after their demodulation and further transmission to the control system CS.

Along with listening to and expanding of data on the connection VL it is also possible that the control system CS takes data from the data stream to the terminal TER. If the terminal TER, for example, is not in the position for a display of a CLIP message or if such a display is not desired by a user of the terminal TER, the control system CS can filter out the CLIP message from the data stream on the connection VL. The user can also prespecify to the control system CS that she/he wishes to have only the name of the caller displayed instead of the telephone number. Then the control system CS takes the CLIP message from the data stream to the terminal TER and inserts a name message into the data stream instead of the CLIP message.

The control system CS can also supply the terminal TER with messages from itself via the connection section VL2. A user of the control system CS, for example a provider of telecommunications services can input a message text at the control system CS, for example a message text with an advertisement or with a current fee, rate for telecommunications services. The message text is then transmitted by the control system CS to the terminal TER and displayed by the terminal TER via the display device DIS.

Furthermore, the terminal TER can be equipped by the control system CS with functions which are generated by the control system CS as executable programs or program blocks, for example so-called macros, or are stored in the memory MEMCS and are loaded via the connection section VL2 into the terminal TER. The terminal TER stores these programs in its memory MEMTER and can call the programs from its memory MEM and execute them in the control means CPUTER at any time to provide functions.

Figure 2:
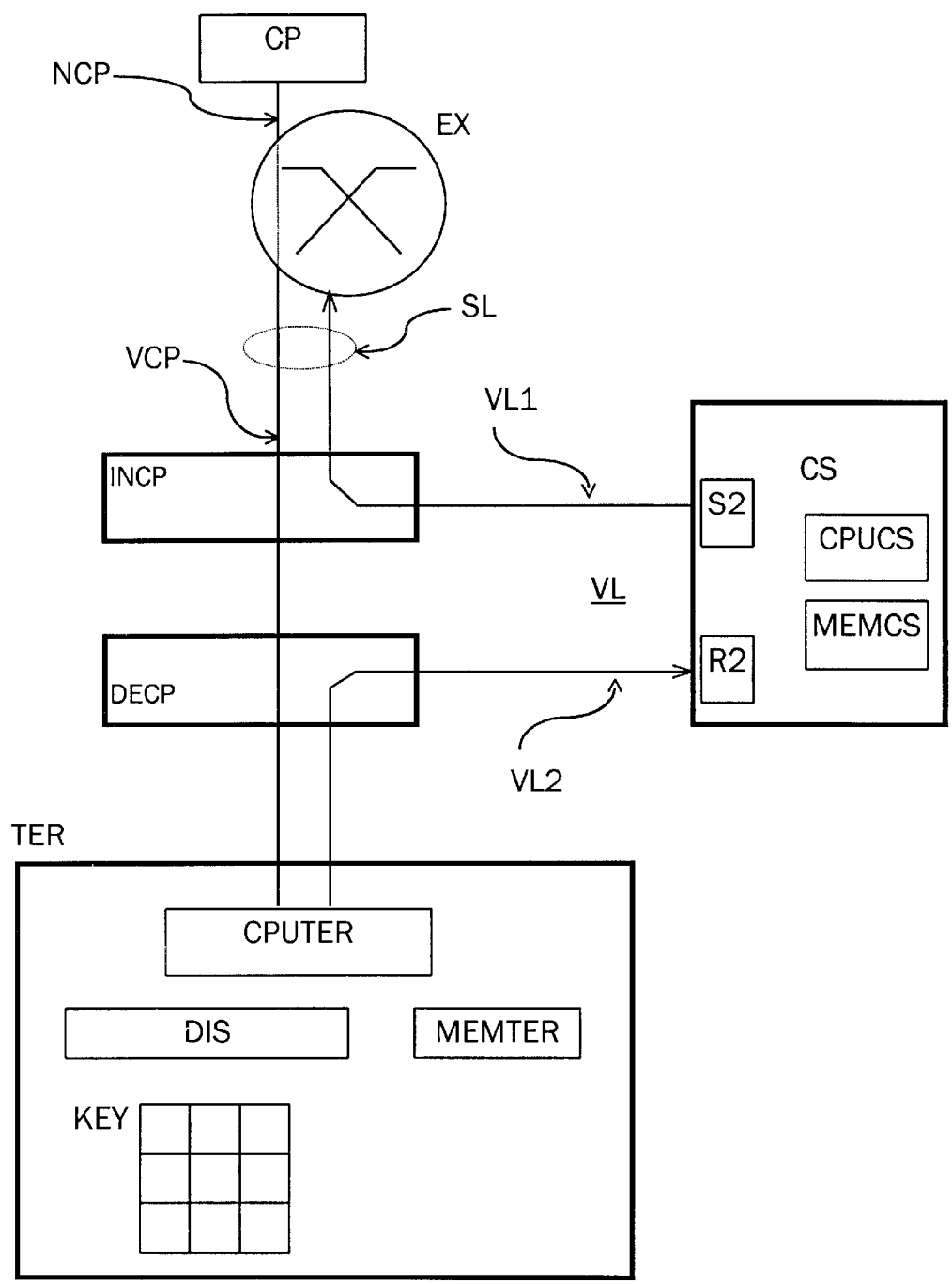
FIG. 2 shows, like FIG. 1, an exemplary arrangement for the implementation of the process according to the invention in which, however, the decoupling device DECP and the incoupling device INCP are disposed interchanged.

In FIG. 2 an arrangement is represented with which an application of the process according to the invention in the direction from the terminal TER to the exchange EX is possible. The components represented in FIG. 2 are identical in their function and mode of action to those components known from FIG. 1 and thus also bear the same reference numbers. However in comparison to FIG. 1 the decoupling device DECP and the incoupling device INCP are exchanged with one another and the points of the arrows of the connection sections VL1 and VL2 show in comparison to FIG. 1 in the opposite direction in order to make clear the reverse flow of data on the connection VL from the terminal TER via the control system CS to the exchange EX. Due to the flow of data on the connection section VL1 reversed in comparison to FIG. 1 the control system CS furthermore has, instead of the input interface R1, the output interface S2 to the connection section VL1 and instead of the output interface S1, the input interface R2 to the connection section VL2. The functions of the decoupling device DECP and the incoupling device INCP are known in principle from FIG. 1 when the subscriber line SL is an analog subscriber line as well as when it is a digital subscriber line. If the terminal TER transmits data on the connection VL to the exchange EX, the decoupling device DECP decouples this data from subscriber line SL and transmits them to the control system CS. Thereby the connection section VL2 of the connection VL is formed. After the control system CS analyzes the data received on the connection section VL2, if necessary expanded or replaced by its own data, the control system CS transmits the data manipulated by it to the incoupling device INCP. The incoupling device INCP then couples this data into the subscriber line SL and thus forms the connection section VL1 of the connection VL.

Also in the case of a data flow on the line VL, as shown in FIG. 2, the terminal TER and the control system CS work together according to the invention. It is possible, for example, that the terminal TER and the control system CS together make possible a speed-dial function. Thereby the terminal TER can transmit a message to the control system CS via the connection section VL2 with a keystroke on one of the keys of the array KEY in order to inform the control system CS concerning the event of the key stroke. Triggered by this message the control system CS can furnish additional functions, for example transmit to the exchange EX a setup message with a telephone number of a desired communications partner device in order to signal the exchange EX that a call request was sent from the terminal TER to the communications partner device. The exchange EX can then establish the desired call connection, for example the connection VCP to the telecommunications device CP. In fact an assignment of one keystroke to a telephone number can also be stored in principle in the memory MEMTER so that the terminal TER can also offer the user of the terminal TER a speed-dial function without the cooperation of the control system CS. Of course memory capacity must then be reserved in the memory MEMTER and the user must have expertise in the programming of a speed-dial function for the terminal TER. Furthermore, the control system CS is preferably maintained by a provider of telecommunications services who can program the assignment of the keystroke to the telephone number into the memory MEMCS on behalf of the user. This service is particularly convenient for the user when the telephone number of a communications partner changes during the day and accordingly the telephone number in the memory MEMCS has to change during the day. Thus, for example, a physician can be reached during the day at her/his practice and in the evening at her/his residence with a single keystroke of one and the same key of the terminal TER and the control system CS chooses at that time the currently valid telephone number for the physician.

In FIGS. 1 and 2 the connections VL were each represented as a unidirectional connection between the exchange EX and the terminal TER. The connection VL can however also be a bidirectional connection.

Figure 3:
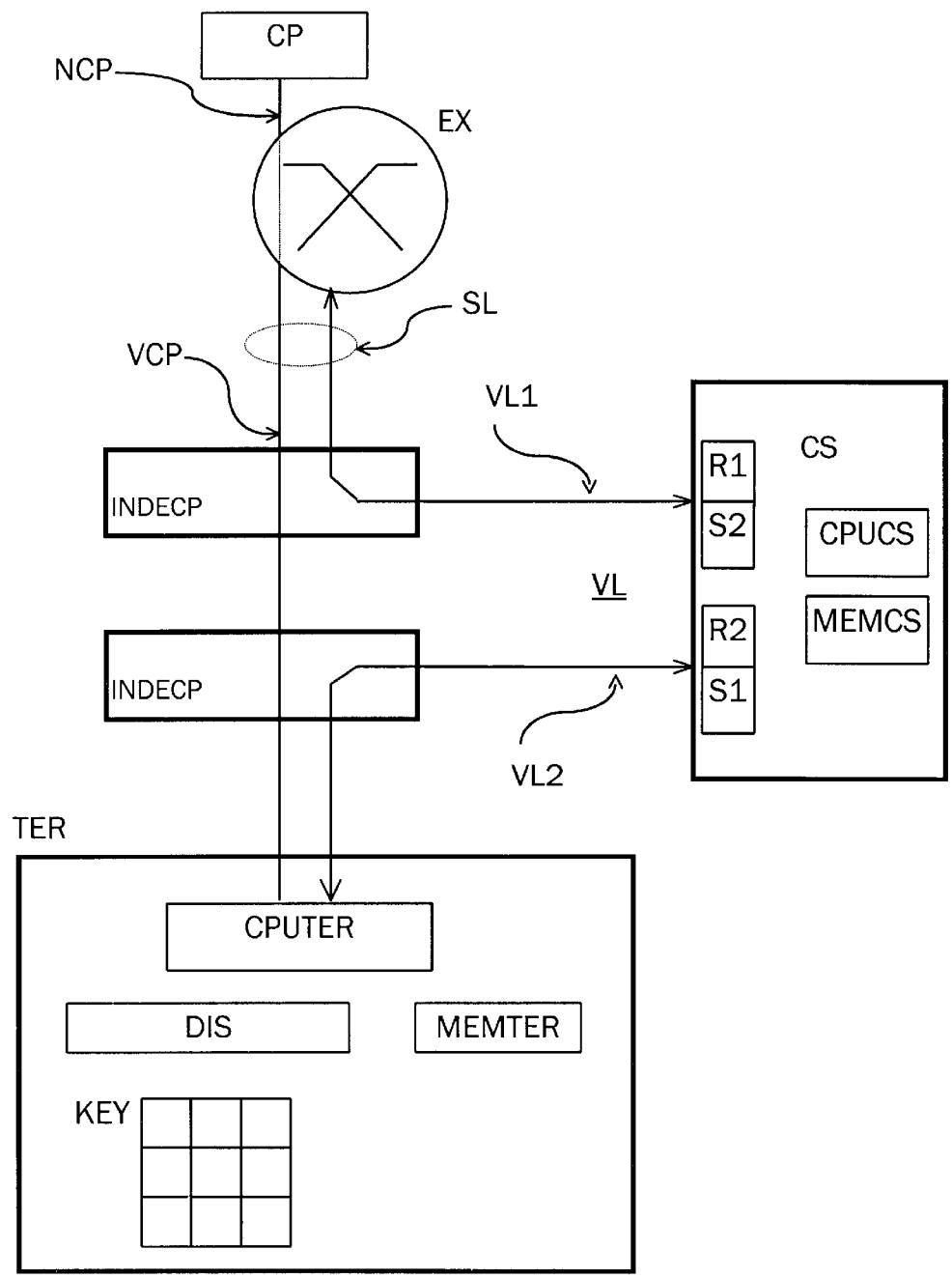
FIG. 3 shows, like FIGS. 1 and 2, an exemplary arrangement for the implementation of the process according to the invention in which however, instead of the decoupling device DECP and the incoupling device INCP, two combination devices INDECP are used.

Such an arrangement is represented in FIG. 3. There the bidirectional transmission of data on the connection sections VL1 and V2 is made clear by the fact that both connection sections have at each of their ends the point of an arrow. The control system CS has in FIG. 3 the input interface R1 to the connection section VL1 known from FIG. 1 for receiving data and the output interface S2 known from FIG. 2 for sending data. Analogously the control system CS has the transmission interface S1 to the connection section VL2 known from FIG. 1 for transmitting data and the input interface R2 known from FIG. 2 for receiving data. In comparison to FIG. 1, a combination device INDECP is connected into the subscriber line in place of each of the decoupling device DECP and the incoupling device INCP. Each of the combination devices INDECP executes the functions of the decoupling device DECP already described as well as the functions of the incoupling device INCP.

By the bidirectional connection VL represented in FIG. 3 the terminal TER with the control system CS can offer the user of the terminal TER convenience functions to a much greater extent than is possible in the case of a unidirectional connection VL as in either of the FIGS. 1 and 2 since the terminal TER and the control system CS can work together interactively. In the following several examples of use are presented for this purpose. For example, the terminal TER can utilize data furnished by the control system CS before the setup of a call. In the memory MEMCS of the control system CS, for example, an address book could be stored which contains the names and the telephone numbers of a selected circle of persons and is configured for the terminal TER. The contents of the address book is made accessible to the user by interactive data exchange between the terminal TER and control system CS on the connection section VL2. Thereby requests for data are sent to the control system CS and the control system CS replies thereto with suitable data. The operator can send requests for data to the control system CS by pressing a key on the key array KEY. The entries of the address book, for example names and residences of conversation partners, are sent to the terminal TER by the control system CS depending on the appropriate pressing of a key by the operator and displayed there via the display device DIS. From the address book the operator can then select an entry on the key array KEY by pressing a key. The terminal TER requests the telephone number of the subscriber line corresponding to this entry from the control system CS and uses the telephone number for the setup of the call on the subscriber line.

With the aid of data from the control system CS the terminal TER can change, independently of preceding steps in operation, an allocation of the keys of the key array KEY with functions which can each be called by pressing a single key on the terminal TER. Such a key allocated with configurable functions is denoted as a "Softkey." The current allocation of the keys with functions is then, for example, made visible by the display of symbols or text on the display device DIS. Thus menu control which is adapted to the current situation with data from the control system CS is available to the operator. In this way the functions of the terminal TER are offered to the user by the working together of the control system CS and the terminal TER.

Via the connection section VL2 the terminal TER can also request data from the control system CS on its own. If, for example, fee information concerning the current state of the ongoing fees in a period for a subscriber line of the terminal TER is stored on the control system CS, the terminal TER can, for example triggered by a timer at times of low network load, ask the control system CS for the fee information. This fee information is then transmitted by the control system CS, received by the control means CPUTER, and passed to the display device DIS where it is displayed.

The convenience functions of the terminal TER can also be used during a connection to the telecommunications device CP. If the terminal TER, for example, is used in an ISDN telecommunications network, then a third communications partner can be made noticeable to the terminal TER by the ISDN convenience feature "knocking." The terminal TER then receives, along with a message with the telephone number of the knocking third communications partner, a message from the control system CS with their name which it can convert into a name display on the display device DIS with the aid of the data on the control system CS, as has already been described above in connection with the CLIP message.

Through the central storage and maintenance in the control system CS it is possible to adapt the functions for a single terminal TER, as also for a group of such terminals which are also connected to the control system CS similarly to the terminal TER, to requirements alternating in common at a central point. The data for these functions are either only requested as needed, such as, for example, in the case of an incoming call or in the framework of a software update loaded into the terminal TER which is initiated by the operator or the service provider. Thus the operator has at her/his disposal current data for her/his terminal TER.

Because the control system CS can provide the terminal TER with functions via a subscriber line, the control system CS does not have to be in the possession of or in the immediate area of availability to the operator of the terminal TER. The operator can, for example, assign to a third party, for example the provider of telecommunications services already mentioned, the task of configuring functions for the terminal TER on the control system CS and loading these functions as data from the control system CS into the terminal TER via the connection VL. In this case the operator of the terminal TER does not have to personally possess expertise in the programming of her/his terminal TER. A function could, for example, be the telephone number allocation for a speed-dialing key already mentioned or the display of particular information on the display device DIS or also a particular configuration of the display on the display device DIS. The service provider can also maintain functions on the control system CS, that is, on its own to adapt to current requirements or to eliminate errors which might possibly occur. The data of the revising functions are then loaded anew from the control system CS to the terminal TER.

By the working together with the terminal TER the control system CS can also execute functions which are typically only executed by the terminal. The control system CS can, for example, receive the ISDN setup message already mentioned on the connection section VL1 and not pass this, as described, to the terminal TER, but rather in the presence of certain prerequisites answer with a negative acknowledgement. If, for example, it is announced in the setup message that the terminal TER is to furnish service functions which it cannot furnish, the control system CS can acknowledge the setup message instead of the terminal TER. In a further step the control system CS could even send a message to its sending counterpart, by which the setup message has been triggered, with which the counterpart is informed of which service functions are possible by the working together of the control system CS and the terminal TER. Then the counterpart can request a service function which can be furnished instead of the service function which cannot be furnished by the terminal TER, for example the counterpart can announce, instead of a fax message, a text file which the terminal TER can display on its display device.

In fact the representations in FIGS. 1 and 2 show arrangements in which the decoupling device DECP and the incoupling device INCP [are] each [shown] as stand-alone devices independent of the exchange EX as well as of the control system CS. The decoupling device DECP and the incoupling device INCP or also corresponding means which can execute comparable functions with these devices, can however also be integrated into the exchange EX or the control system CS. Of the subscriber line SL is an ISDN subscriber line, it is however also possible that the exchange EX separates the D-channel data packets from the B-channel data packets intended for the subscriber line SL with the aid of a decoupling device DECP integrated into the exchange EX and transmits them on the connection section VL1 to the control system CS. This form of embodiment of the invention is particularly advantageous when the exchange EX is handling in this way several subscriber lines of the same type as the subscriber line SL and parallel to it and conducts their respective D-channel data packets in common on a type of busbar to the control system CS. The connection section VL1 is then to be seen as a part of this busbar. In the manner already described the control system CS processes the D-channel data packets of the respective subscriber lines. Then the control system CS once again sends the modified or expanded D-channel data packets, also on a type of busbar, to the exchange EX which then incouples them once again them into their respective data streams for their respective subscriber lines with the aid of a incoupling device INCP integrated into the exchange EX.

The demodulation of signals from a line with analog transmission and the modulation of such signals into a line can be executed by prior-art devices. Such a process and the corresponding devices are, for example, mentioned in the article mentioned initially "Rufnummeranzeige am analogen Anschluβ" [in English translation, Telephone Number Display in the Analog Connection] in the journal "Funkschau," Edition of October 1998. Likewise multiplexers and demultiplexers are known in themselves with which data packets can be fed into a line or taken from a line in the case of digital transmission. Such devices are in each case however only designed for operation on a single line. For advantageous use of the invention in practice it is however expedient that an entire bundle of subscriber lines be accessed at one transfer point of an exchange or a foreground device and are conducted to a decoupling device according to the invention as well as to an incoupling device according to the invention. If namely connections from entire bundles of subscriber lines are decoupled and incoupled once again, these connections can be conducted in common to a control system, for example, the control system CS which then can work together in parallel with several terminals comparable to the terminal TER and can execute the functions represented above. In this manner it is possible for a provider of telecommunications services to offer, with the aid of the control system CS, these functions simultaneously on a plurality of subscriber lines and thus to distinguish itself in its offering of services from other providers of telecommunications services.

Figure 4:
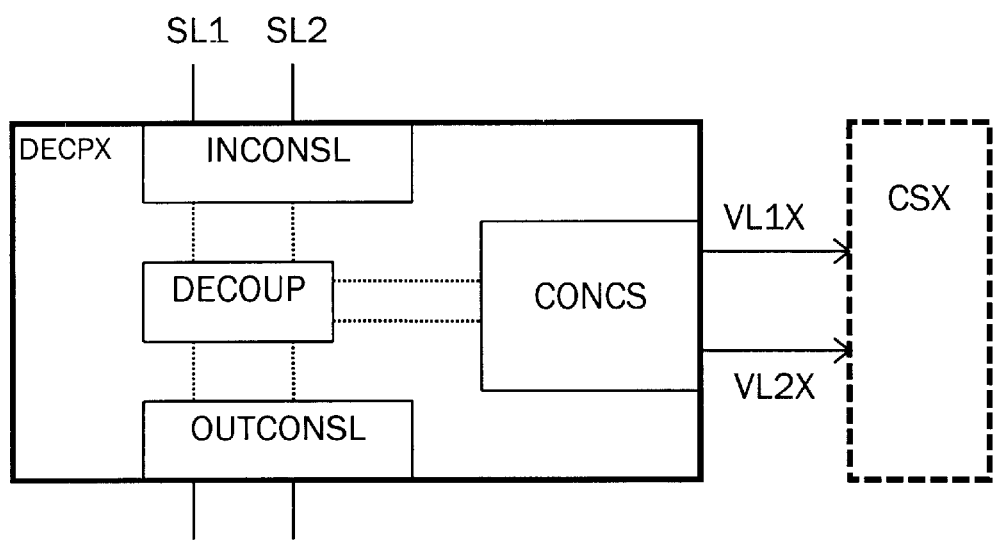
FIG. 4 shows a decoupling device DECPX according to the invention.

In FIG. 4 a decoupling device DECPX is represented with which a connection can be decoupled from each of several subscriber lines. To the decoupling device DECPX a subscriber line SL1 and a subscriber line SL2 are connected via a connecting unit INCONSL which like the subscriber line SL known from FIG. 1, are each between an exchange and a terminal and on which several are also possible at the same time, as was explained with the aid of the connections VCP and VL on the subscriber line SL in FIG. 1. Along with the subscriber lines SL1 and SL2 additional subscriber lines, not represented in FIG. 4, can also be connected to the decoupling device DECPX. The subscriber lines SL1 and SL2 leading into the connecting unit INCONSL can, for example, come from a transfer point of an exchange, for example, of the exchange EX. Within the decoupling device DECPX the subscriber lines SL1 and SL2 lead into a decoupling unit DECOUP and from there further into a connecting unit OUTCONSL. From there the subscriber lines SL1 and SL2 are conducted further to terminals, for example to the terminal TER known from FIG. 1. It is however also possible that the decoupling device DECPX is used in the reverse direction and the subscriber lines SL1 and SL2 coming from terminals are connected to the connecting unit INCONSL and then are conducted further from the connecting unit OUTCONSL to an exchange.

Within the decoupling device DECPX the decoupling unit DECOUP decouples a connection VL1X from the subscriber line SL1 and decouples a connection VL2X from the subscriber line SL2. With the aid of the decoupling device DECP in FIG. 1 such a decoupling from a subscriber line by demodulation or demultiplexing has already been described. The decoupling unit DECOUP further conducts the decoupled connections VL1X and VL2X over a connecting unit CONCS to a control system CSX, for example which is the same in its functions as the control system CS known from FIG. 1. The connections VL1X and VL2X between the connecting unit CONCS and the control system CSX can also be on a busbar. If the subscriber lines SL1 and SL2 are, for example, ISDN subscriber lines, then the decoupling unit DECOUP can decouple, multiplex, and transmit serially each of the data packets transmitted on the D-channel of these ISDN subscriber lines to the control system CSX. The decoupling device DECPX can also be connected via parallel lines to the control system CSX. The connections existing within the decoupling device DECPX are merely indicated by several dotted lines. As the control device CS from FIGS. 1 to 3 receives data on the connection VL, the control device CSX can also receive data on the connections VL1X and VL2X and thereby provide functions to terminals in the same manner as the control device CS.

Figure 5:
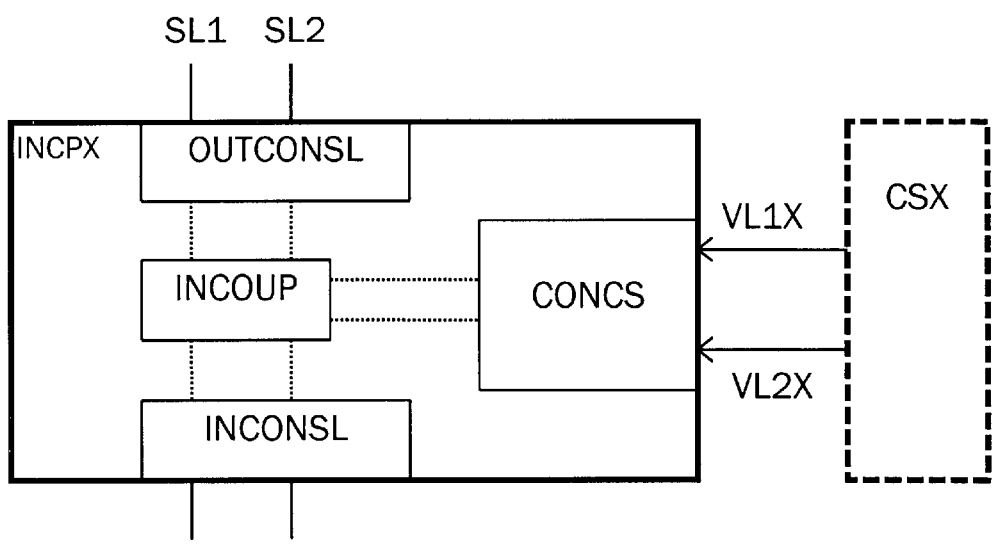
FIG. 5 shows a incoupling device INCPX according to the invention.

In FIG. 5, an incoupling device INCPX according to the invention is represented via which at least one connection can be incoupled into each of the subscriber lines. The incoupling device INCPX has, like the decoupling device DECPX from FIG. 4, a connecting means INCONSL and a connecting means OUTCONSL via which the subscriber lines SL1 and SL2, also known from FIG. 4, can be connected to the incoupling device INCPX in a known manner. The control system CSX is connected to the incoupling device INCPX via the connecting unit CONCS known from FIG. 4. In contradistinction to FIG. 4 however, in FIG. 5 the control system CSX sends data to the incoupling device INCPX via the connections VL1X and VL2X. To make the reverse flow of data clear, the points of the arrows of the connections VL1X and VL2X point towards the incoupling device INCPX. Instead of the decoupling unit DECOUP, the incoupling device INCPX has an incoupling unit INCOUP which incouples the connection VL1X to the subscriber line SL1 and the connection VL2X to the subscriber line SL2. On the connections VL1X and VL2X the control system CSX can send manipulated data to provide functions in terminals, as has already been described above in connection with the connection VL and control system CS.

Figure 6:
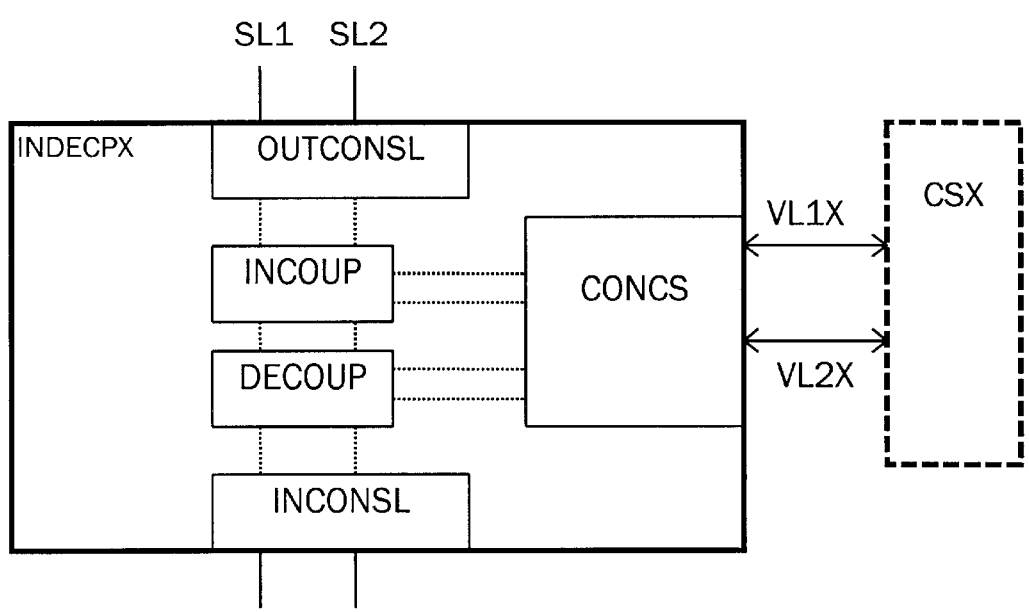
FIG. 6 shows a combination device INDECPX according to the invention.

In FIG. 6 a combination device INDECPX is represented which can execute, with the aid of the components known from FIGS. 4 and 5, the functions of the decoupling device DECPX as well as the functions of the incoupling device INCPX. The combination device INDECPX decouples connections from subscriber lines like the decoupling device DECPX from FIG. 4 with the aid of a decoupling unit DECOUP. In the example from FIG. 6 the subscriber lines SL1 and SL2 known from the previous figures are connected to the combination device INDECPX via the connecting means INCONSL and OUTCONSL which are also known. From the subscriber lines SL1 and SL2 the decoupling unit DECOUP decouples the connections VL1X and VL2X and conducts them to the connecting unit CONCS known from FIG. 4 to which the known control system CSX can be connected. Via the connections VL1X and VL2X the control system CSX can send as well as receive data. This is made clear in FIG. 6 by the points of the arrows at both ends of the connections VL1X and VL2X. Data sent from the control system CSX on the connections VL1X and VL2X are received by the connecting unit CONCS of the combination device INDECPX and incoupled via the incoupling unit INCOUP into the subscriber lines SL1 and SL2.

What is claimed is:

1. A process for providing functions to a telecommunications terminal connected to an exchange via a subscriber line comprising:

connecting the subscriber line to a control system on a network side by decoupling data from the subscriber line to form a first connection from the subscriber line to the control system;

manipulating, at the control system, the data decoupled from the subscriber line to provide functions to the terminal; and incoupling the manipulated data from the control system back into the subscriber line thereby forming a second connection from the control system to the subscriber line.

2. The process according to claim 1, wherein the subscriber line is operated as the subscriber line of a digital telecommunications network.

3. The process according to claim 2, wherein the subscriber line is operated as the subscriber line of an ISDN telecommunications network and wherein the first and second connections, carried out via the control system is a D-channel, is decoupled from the subscriber line and is once again incoupled into the subscriber line.

4. The process according to claim 1, wherein the first and second connections are carried out via the control system by incoupling and decoupling of in-band signaling.

5. The process according to claim 1, wherein when the first and second connection control data is exchanged between the terminal and the exchange, the control system monitors the control data and changes the control data according to predetermined rules.

6. The process according to claim 1, wherein the control system loads data into the terminal via the second connection.

7. A control system for a telecommunications network with devices for providing functions to a terminal connected via a subscriber line to an exchange, said control system comprising:

a receiving unit configured to receive data from a decoupler connected to the subscriber line, via a first connection between the control system and the subscriber line;

a transmission unit configured to incouple the decoupled data into the subscriber line through an incoupler connected to the subscriber line, thus forming a second connection between the control system and the subscriber line;

wherein the control system provides the functions to the terminal by manipulating the data received from the subscriber line on the first connection and transmitting the manipulated data back to the subscriber line on the second connection.

8. An incoupling device for providing functions to at least one telecommunications terminal connected to an exchange via a subscriber line, said incoupling device comprising:

a connecting apparatus, having a first connection to the subscriber line and having a second connection to at least one additional subscriber line;

an incoupling apparatus with which the incoupling device can incouple at least the first and second connections into both the subscriber line and the at least one additional subscriber line, and;

a connection device via which at least one control system can be connected to the first and second connections incoupled by the incoupling device and via which the incoupling device can receive data from the at least one control system with which the functions can be provided at least at the terminal.

9. A decoupling device for providing functions to at least one telecommunications terminal connected to an exchange via a subscriber line, said decoupling device comprising:

a connecting apparatus having a first connection to the subscriber line and having a second connection to at least one additional subscriber line;

a decoupling apparatus with which the decoupling device can decouple at least the first and second connections from each of the subscriber line and the at least one additional subscriber line, and a connection device via which at least one control system is connected to the first and second connections decoupled by the decoupling device and via which the decoupling device transmits data to the at least one control system, wherein the control system manipulates the data to provide functions to the terminal.

10. A combination device for providing functions to at least one telecommunications terminal connected to an exchange via a subscriber line, said combination device comprising:

a connecting apparatus having a first connection to the subscriber line and having a second connection to at least one additional subscriber line;

a decoupling apparatus for decoupling at least the respective first and second connections from both the subscriber line and the at least one additional subscriber line, an incoupling apparatus for incoupling the respective first and second connections into both the subscriber line and the at least one additional subscriber line; and a connection device via which at least one control system is connected to the first and second connections decoupled by the combination device and via which the combination device transmits data to the at least one control system or can receive data from the at least one control system, wherein said control system manipulates the data to provide functions to the terminal.

11. A telecommunications network for providing functions to a telecommunications terminal connected to an exchange via a subscriber line comprising:

a first connection, said first connection configured to connect the subscriber line to a control system on a network side by decoupling data from the subscribe line;

a manipulation unit, said manipulation unit configured to manipulate, at the control system, the data decoupled from the subscriber line to provide functions to the terminal; and a second connection, said second connection configured to incouple the manipulated data from the control system back into the subscriber line.

12. The telecommunications network according to claim 11, wherein the subscriber line is operated as a subscriber line of a digital telecommunications network.

13. The telecommunications network according to claim 11, wherein the subscriber line is operated as a subscriber line of an ISDN telecommunications network and wherein the first and second connections, carried out via the control system is a D-channel which is decoupled from the subscriber line and is once again incoupled into the subscriber line.

14. The telecommunications network according to claim 11, wherein the first and second connections are carried out via the control system by incoupling and decoupling of in-band signaling.

15. The telecommunications network according to claim 11, wherein when the first and second connection control data is exchanged between the terminal and the exchange, the control system monitors the control data and changes the control data according to predetermined rules.

16. The telecommunications network according to claim 11, wherein the control system loads data into the terminal via the second connection.

* * * * *